(12) United States Patent
Sato et al.

(10) Patent No.: US 6,793,692 B2
(45) Date of Patent: Sep. 21, 2004

(54) ELECTRICAL COMPONENT AND METHOD FOR MANUFACTURING THE SAME

(75) Inventors: Takaya Sato, Chiba (JP); Tatsuo Shimizu, Tokyo (JP)

(73) Assignees: Nisshinbo Industries, Inc., Tokyo (JP); Itochu Corporation, Osaka (JP)

( * ) Notice: Subject to any disclaimer, the term of this patent is extended or adjusted under 35 U.S.C. 154(b) by 135 days.

(21) Appl. No.: 09/853,050

(22) Filed: May 11, 2001

(65) Prior Publication Data

US 2002/0042986 A1 Apr. 18, 2002

(30) Foreign Application Priority Data

May 15, 2000 (JP) ........................................ 2000-141687

(51) Int. Cl.[7] ........................ H01M 10/38; H01M 6/18; H01M 6/22; H01G 9/00
(52) U.S. Cl. ..................... 29/623.5; 29/623.1; 29/25.03
(58) Field of Search ................................ 429/303, 306; 29/623.1, 623.5, 25.03

(56) References Cited

U.S. PATENT DOCUMENTS 6,420,071 B1 * 7/2002 Lee et al. .................... 429/300

FOREIGN PATENT DOCUMENTS

| DE | 198 30 993 A1 | 1/2000 |
|---|---|---|
| EP | 1 041 658 A1 | 10/2000 |
| JP | 08 225626 A | 9/1996 |
| WO | WO 99/49531 | 9/1999 |

OTHER PUBLICATIONS

Osaka et al., "Acetylene black/poly(vinylidene fluoride) gel electrolyte composite electrode for an electric double–layer capacitor", Journal of Power Sources, vol. 74, No. 1, pp. 122–128 (1998), no month.

Clericuzio et al., "Ionic diffusivity and conductivity of plasticized polymer electrolytes: PMFG–NMR and complex impendance studies", Solid State Ionics, North Holland Pub. Company; vol. 82, No. 3, pp. 179–192 (1995), no month.

* cited by examiner

*Primary Examiner*—John S. Maples
(74) *Attorney, Agent, or Firm*—Apex Juris, pllc; Tracy M. Heims

(57) ABSTRACT

To provide an electrical component, in which ions migrate between electrodes and which provides high efficiency. A method for manufacturing an electrical component, in which ions migrate between electrodes, whereby an ion conductive polymer layer 2 dissolving ions is formed on an electrode material layer 12 of at least one of a pair of electrode structures 1 which comprise an electrode material layer 12 formed on a current collector 11, said pair of electrode structures 1 are arranged at opposed positions with the current collector 11 facing outward, and this is stored in a housing 4, and liquid electrolyte is injected into the housing.

15 Claims, 7 Drawing Sheets

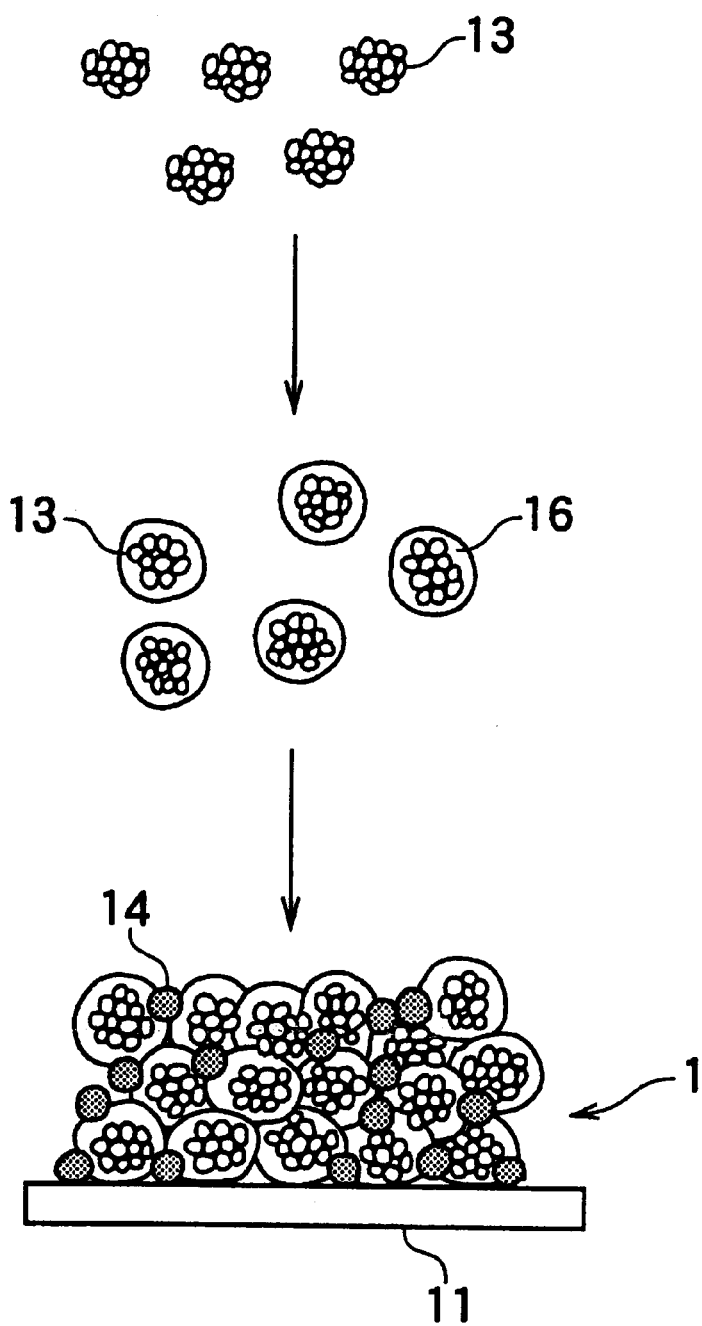

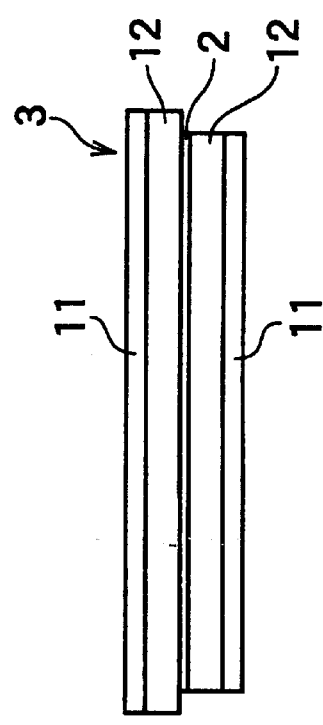
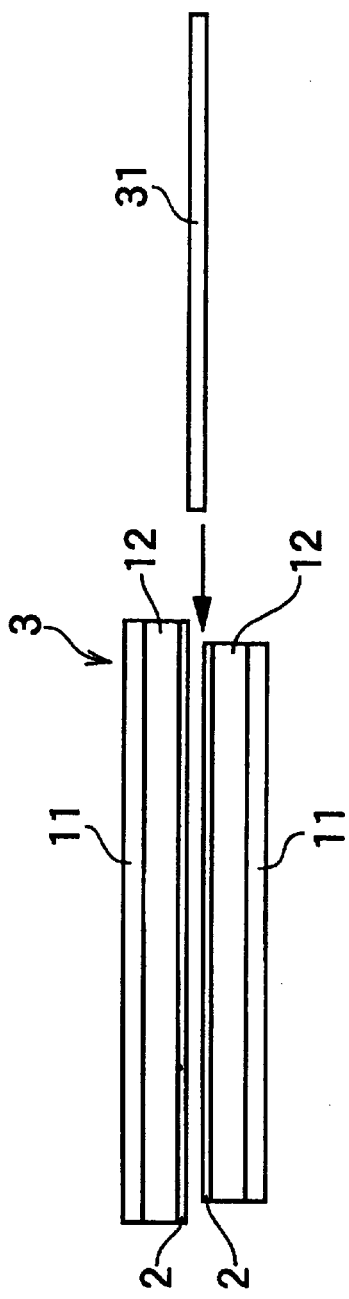
Fig. 4A
Fig. 4B

ELECTRICAL COMPONENT AND METHOD FOR MANUFACTURING THE SAME

FIELD OF THE INVENTION

The present invention relates to manufacture of electrical component such as a battery or an electrical double layer capacitor.

DESCRIPTION OF PRIOR ART

In the past, a battery where ions migrate between electrodes, called a polymer gel battery and which has an ion conductive polymer layer arranged between the positive electrode structure and the negative electrode structure is known. A typical method for manufacturing this battery is as follows: P(VdF-HFP), i.e. a copolymer of vinylidene fluoride and propylene hexafluoride, dibutyl phthalic acid (DBP), silica particles, and acetone are mixed together and turned to paste-like state. This paste is coated on positive and negative electrode structures. A separator is disposed between the positive and the negative electrodes which are arranged at opposed positions and are integrated by heating and pressing. Then, DBP is extracted using an extraction solvent and is washed. A liquid electrolyte containing ion conductive salt is penetrated into it, and a battery is prepared. However, there have been problems with this method; specifically, in that the liquid electrolyte containing ion conductive salt is not easily penetrated into a polymer layer rapidly and evenly, preventing the production of a battery of good quality.

OBJECT AND SUMMARY OF THE INVENTION

The present invention aims to provide an electrical component, in which ions migrate between electrodes and which can provide a higher efficiency.

The present invention also aims to provide an electrical component, in which ions migrate between electrodes and which ensures higher safety.

Also, the present invention aims to provide a battery or an electrical double layer capacitor, which provides higher efficiency.

The present invention also aims to provide a method for penetrating the liquid electrolyte into ion conductive polymer layer both evenly and rapidly.

The present invention provides a method for manufacturing an electrical component where ions migrate between electrodes, said method comprising the steps of: forming an ion conductive polymer layer; dissolving ions on an electrode material layer of at least one of electrode structures, said one of electrode structures comprises an electrode material layer formed on a current collector; arranging a pair of electrode structures at opposed positions; and accommodating the electrode structures in an accommodation unit.

BRIEF DESCRIPTION OF THE DRAWINGS

The above and other objects and advantages of the present invention will become readily apparent by reference to the following detailed description when considered in conjunction with the accompanying drawings.

FIG. 2 is a drawing of an electrode structure containing electrode active material;

FIGS. 4A–4B shows schematical drawings of element members of a battery;

DETAILED DESCRIPTION OF PREFERRED EMBODIMENT

In the following, a description will be given concerning embodiments of the present invention with reference to the drawings.

(a) Electrical Component

In an electrical component, in which ions migrate between electrodes, ion conductive materials are arranged between electrode structures and ions migrate within the ion conductive materials allowing electrical current to flow between the electrodes. Examples of, such electrical components includes a battery, an electrical double layer capacitor, etc.

In a battery, ion conductive materials are arranged between two types of electrode structures, i.e. a positive electrode structure and a negative electrode structure, and ions (including protons, i.e. cations of hydrogen) migrate from one of the electrode structures to the other electrode structure where they are accumulated. In an electrical double layer capacitor, ion conductive materials are arranged between a pair of electrode structures, and an electrical double layer is formed between a material with a high surface area in the electrode structure and an electrolyte of the ion conductive material.

(b) Electrode Structure

Figure 1A:
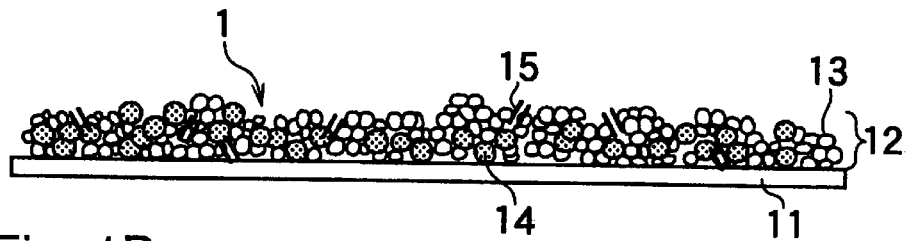
FIGS. 1A–1F represents drawings of a plurality of types of electrode structures containing electrode material.
Figure 1B:
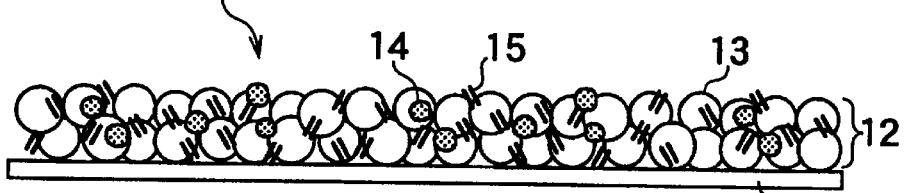
Figure 1C:
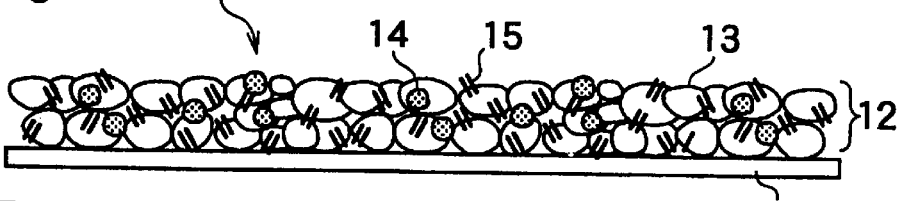

An electrode structure is used as an electrode of an electrical component, and can deliver and receive electricity to and from ions or can attract ions. In this respect, an electrode structure 1 comprises a layer of electrode material 13 (an electrode material layer 12) on a conductive material such as aluminum or copper. The electrode material 13 can deliver and receive electricity to and from ions and has electric attracting power. As shown in FIG. 1(A), the electrode material 13 is used as a positive electrode structure of a battery using particulate material comprising bonded particles of powdery electrode active material such as $LiCoO_2$. As shown in FIG. 1(B), the electrode material 13 is used as a negative electrode structure of a battery and uses particulate material of powdery electrode active material, such as graphite, hard carbon, etc.,. As shown in FIG. 1(C), the electrode material 13 uses particulate material such as activated carbon, i.e. a powdery high surface area material with a larger surface area, and is used as an electrode structure 1 of an electrical double layer capacitor. In FIG. 1, the electrode material layer 12 is formed on one surface of a current collector 11, alternatively the electrode material layer 12 may be provided on both surfaces.

Figure 1D:
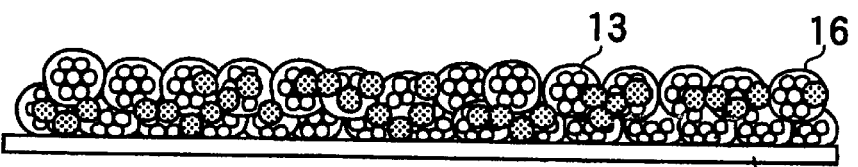
Figure 1E:
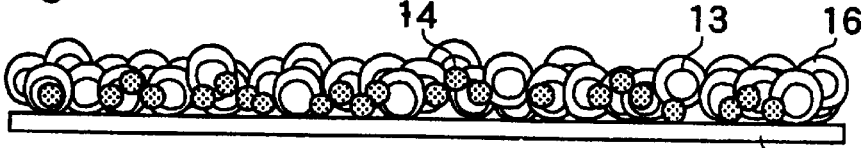
Figure 1F:
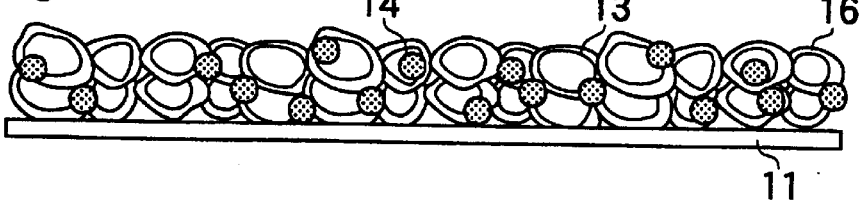

In FIG. 1(D), the powdery electrode material 13 of FIG. 1(A) is covered with an ion conductive polymer, and is used as the positive electrode structure of a battery. In FIG. 1(E), the powdery electrode material 13 of FIG. 1(B) is covered with an ion conductive polymer, and is used as the negative electrode structure of a battery. In FIG. 1(F), the powdery electrode material 13 of FIG. 1(C) is covered with the ion conductive polymer, and is used as an electrode structure 1 of an electrical double layer capacitor.

FIG. 2 shows a process in which to produce the electrode structure 1 of FIG. 1(D). As shown in FIG. 2, the powdery electrode material 13 comprises bonding particles such as LiCoO$_2$, where it is covered with an ion conductive polymer 16 and is attached to a current collector 11. The electrode structure 1 as shown in FIG. 1(E) and FIG. 1(F) can also be produced in a similar manner. The conductive material 14 arranged in the electrode structure enhances electrical conductivity between the electrode materials 13 and between the electrode material 13 and the current collector 11 as well as improves the current collecting efficiency.

Here, "adhere" or "adhesion" means that ions are attached in such a manner that the ions can migrate between the ion conductive polymer 16 and the entire surface of the powdery electrode material 13. It means that the ion conductive polymer 16 adheres to the surface of the powdery electrode material 13 and covers it with the ion conductive polymer 16. The finer the particles, the more active the powdery electrode material 13. When it is adhered to and covered by the ion conductive polymer 16, the activity is suppressed and can be turned into a more stable state.

If the adhered layer of the ion conductive polymer 16 is thick, electrical conductivity is decreased, and this leads to a lower current collecting efficiency. Therefore, it would be better to forma thinner polymer layer.

The word "powdery" in the powdery electrode material 13 and the powdery conductive material 14 means a material in a fine powder state. In some cases, it means a condition where many fine powdery materials are accumulated.

Here, description of terms used in the description of the electrode structure 1 is provided. First, the electrode structure 1 is obtained by forming the electrode material layer 12 on the current collector 11. The electrode material layer 12 contains the electrode material 13, and comprises a conductive material 14 or a binder 15 when necessary. The electrode material 13 is an electrode active material used as an electrode of a battery or a high surface area material used as an electrode for an electrical double layer capacitor. The electrode active material means a powdery electrode active material for positive electrode such as LiCoO$_2$ to be used as a positive electrode, or a powdery electrode active material for negative electrode such as carbon material to be used as a negative electrode.

(c) Electrode Active Material

A material where ions can be placed into or removed from, or a π-conjugate conductive macromolecular material may be used as the electrode active material. For instance, there is no specific restriction on the use of the electrode active material that can be used as a positive electrode of a nonaqueous electrolyte battery, but in case of a chargeable secondary battery, a chalcogen compound where lithium ions can be placed into or removed from, or a complex chalcogen compound containing lithium may be used.

The chalcogen compound as described above may include FeS$_2$, TiS$_2$, MOS$_2$, V$_2$O$_5$, V6O$_{12}$, MnO$_2$, etc. The complex chalcogen compound containing lithium, as described above, may include LiCoO$_2$, lithium complex oxide expressed by Li$_x$Ni$_y$M$_{1-y}$O$_2$ (where M represents at least one type of metal element selected from transition metal or aluminum, or more preferably, it represents at least one type of metal element selected from Co, Mn, Ti, Cr, V, or Al, and 0.05±x±1.10 and 0.5±y±1.0), LiNiO$_2$, LiMnO$_2$, LiMn$_2$O$_4$, etc. These compounds are obtained as follows: Using oxide, salt or hydroxide of lithium, cobalt, nickel or manganese as starting materials; mixing the starting materials in adequate composition; and firing the mixture in the temperature range of 600° C.–1000° C. under an oxygen atmosphere.

As for a proper electrode active material to be used as a negative electrode of a nonaqueous electrolyte battery, there is no specific restriction. Any material where lithium ions can be placed into or removed from maybe used. Examples of such include but are not limited to; Lithium metal, lithium alloy (an alloy of lithium with aluminum, lead, or indium), carbonaceous material, etc.

As the an adequate π-conjugate conductive macromolecular material, the following compounds may be used: polyacetylene, polyaniline, polypyrrole, polythiophene, poly-ρ (para)-phenylene, polycarbazole, polyacene, sulfurpolymer, etc. Again the π-conjugate conductive macromolecular material is not limited to those compounds listed above.

In particular, in a nonaqueous electrolyte primary battery, higher battery capacity can be obtained when lithium metal is used as the negative electrode. That is, lithium metal not in powdery state.

Also, in the nonaqueous electrolyte secondary battery, excellent cycle service life can be attained if a carbon material where lithium ions can be placed into and removed from is used as the negative electrode. There is no specific restriction on the carbon material, and the following materials may be used: thermally decomposed carbons, cokes (pitch cokes, needle cokes, petroleum cokes, etc.), graphite, vitreous carbons, organic macromolecular compound fired product (product obtained by firing and carbonizing phenol resin, furane resin, etc. at adequate temperature), carbon fiber, activated carbon, etc.

(d) Electrode Material with a Larger Surface Area

The electrode material with a larger surface area is a powdery high surface area material, which can attract many ions to the surface. Preferably, it has a specific surface area of 500 m$^2$/g or more, or more preferably 1000 m$^2$/g or more, or most preferably 1500 m$^2$/g-3000m$^2$/g. Also, it has average particle size of 30 μm or less, or more preferably 5–30 μm. If the specific surface area and the average particle size outside the above ranges, capacitance is too high; thus, it may be difficult to obtain an electrical double layer capacitor with low resistance.

As a powdery high surface area material, it is preferable to use an activated carbon, which can be obtained from carbon material by a steam activation method or by a melted KOH activation process. Adequate activated carbons include: coconut shell activated carbon, phenol type activated carbon, petroleum cokes type activated carbon, polyacene, etc. These materials can be used alone or in a combination of two types or more. Above all, it is preferable to use phenol type activated carbon, petroleum cokes type activated carbon, or polyacene.

(e) Conductive Material

The conductive material is used to increase electrical conductivity of the electrode structure, and there is no specific restriction. For instance, metal powder, carbon black, ketchen black, acetylene black, carbon whisker, natural graphite, artificial graphite, metal fiber, titanium oxide, ruthenium oxide, etc. may all used as well as other metal powders. These materials may be used alone or in any combination of two types or more. Above all, it is preferable to use one type of carbon black, i.e. ketchen black or acetylene black. The average particle size of the powdery conductive material is preferably 10–100 nm, or more preferably 20–40 nm.

(f) Ion Conductive Salt

Any material normally used for electrochemical product may be used as the ion conductive salt, as there is no specific restriction. In particular, it is preferable to use a salt obtained by combination of quaternary onium cation expressed by the general formulas $R^1R^2R^3R^4N^+$ or $R^1R^2R^3R^4P^+$ (where $R^1$–$R^4$ each represents an alkyl group having 1–10 carbon atoms and may be the same or different) with anion such as $BF_4^-$, $N(CF_3SO_2)_2^-$, $PF_3^-$, $ClO_4^-$, etc.

More specifically, the following list of ion conductive salt used may be used for a capacitor: $(C_2H_5)_4PBF_4$, $(C_3H_7)_4PBF_4$, $(C_4H_9)_4PBF_4$, $(C_5H_{13})_4PBF_4$, $(C_4H_9)_3CH_2PBF_4$, $(C_2H_5)_3$ (Ph—$CH_2$)$PBF_4$ (where Ph represents a phenyl group), $(C_2H_5)_4PPF_4$, $(C_2H_6)PCF_3SO_2$, $(C_2H_5)_4NBF_4$, $(C_4H_9)_4NBF_4$, $(C_5H_{13})_4NBF_4$, $(C_2H_6)_4NPF_4$, $LiBEF_4$, $LiCF_3SO_2$, $CH_3(C_2H_5)_3NBF_4$, etc. These materials may be used alone or in a combination of two types or more.

As for the ion conductive salt used for a nonaqueous electrolyte secondary battery such as lithium ion battery, any material normally used for electrochemical product may also be used, and there being no specific restriction. For instance, $LiClO_4$, $LiBF_4$, $LiAsF_6$, $LiPF_4$, $LiSbF_6$, $LiCF_6SO_3$, $LiCF_2COO$, $NaClO_4$, $NaBF_4$, $NaSCN$, $KBF_4$, $Mg(ClO_4)_2$, $Mg(BF_4)_2$, $(C_4H_9)_4NBF_4$, $(C_2H_5)_4NBF_4$, $(C_4H_9)_4NClO_4$, $LiN(CF_2SO_3)_2$, $Et_4NPF_3$ (where Et represents an ethyl group), etc. may all be used. These materials may be used alone or in a combination of two types or more.

(g) Liquid Electrolyte

As the liquid electrolyte, the following materials may be used: chain ethers such as dibutyl ether, 1,2-dimethoxyethane, 1,2-ethoxymethoxyethane, methyldiglyme, methyltriglyme, methyltetraglyme, ethylglyme, ethyldiglyme, butyldiglyme, etc., glycol ethers (such as ethyl cellosolve, ethyl carbitol, butyl cellosolve, butyl carbitol, etc.), heterocyclic ethers such as tetrahydrofurane, 2-methyl tetrahydrofurane, 1,3-dioxolan, 4,4-dimethyl-1,3-dioxan, etc., butyrolactones such as γ-butyrolactone, γ-valerolactone, δ-valerolactone, 3-methyl-1,3-oxazolidine-2-one, 3-ethyl-1,3-oxazolidine-2-one, etc., and any other amide solvent normally used for electrochemical products (N-methylformaldehyde, N,N-dimethylformaldehyde, N-methylacetamide, N-methylpyrrolidinone, etc.), carbonate solvent (such as diethyl carbonate, dimethyl carbonate, ethylmethyl carbonate, propylene carbonate, ethylene carbonate, styrene carbonate, etc.), imidazolidinone solvent (such as 1,3-dimethyl-2-imidazolidinone), etc. may be used. These solvents may be used alone or in a combination of two types or more.

(h) Ion Conductive Polymer

The ion conductive polymer is a polymer, which can dissolve at least an ion conductive salt such as lithium salt below at concentration of 0.1 M (mol/l) or more, and the polymer dissolving ion conductive salt such as lithium salt at any given concentration of 0.1 M or more shows an electrical conductivity of $10^{-8}$ S (siemens)/cm or more at room temperature. However, at the concentration of 0.1 M/L, the electrical conductivity will not be $10^{-8}$ S/cm or more while at the concentration of 0.8 M/L, the electrical conductivity may be $10^{-8}$ S/cm or more. Preferably, it is an ion conductive polymer, which dissolves at least ion conductive salt such as lithium salt and exhibits electrical conductivity of $10^{-3}$ S/cm-$10^{-5}$ S/cm at room temperature.

As a suitable lithium salt, any one type or more of lithium salts containing $ClO_4^-$, $CF_2SO_3^-$, $BF_4^-$, $PF_6^-$, $AsF_6^-$, $SbF_6^-$, $CF_3CO_2^-$, $(CF_3SO_2)_2N^-$, etc. as an anion may be used.

Here, terms relating to the ion conductive polymer will be described. The material for forming the ion conductive polymer is a material for preparing ion conductive polymer layer 2 to be formed on the electrode structure 1 or an ion conductive polymer, which is adhered to powdery electrode material. It represents an ion conductive polymer itself, an ion conductive polymer raw material, or both. A coating material 22 for forming the ion conductive polymer is a material to be coated for forming the ion conductive polymer layer, and it is a mixture of the material for forming ion conductive polymer itself or ion conductive salt or solvent.

(i) Ion Conductive Polymer Raw Material

The ion conductive polymer raw material is a material, which is turned into an ion conductive polymer by polymerization, crosslinking, etc. when energy is added from outside. The energy to be added may be heat, ultraviolet ray, light, electronic beam, etc. The ion conductive polymer raw material is added to give physical strength such as form retaining property.

Under the condition where the ion conductive polymer itself and the ion conductive polymer raw material coexist, energy is added from outside, and the ion conductive polymer raw material is allowed to react, forming 3-dimensional network. In this case, the ion conductive polymer itself is entangled with the 3-dimensional network (entanglement). This is called a "semi-interpenetrating network system" and shows excellent physical properties. The ion conductive polymer having such a structure is described in the patent publication JP-A-8-225626 as filed by the present inventors. The ion conductive polymer thus obtained has a high strength, absorbs the solvent well and has a high adhesive strength. The ion conductive polymer obtained from the ion conductive polymer itself and ion conductive polymer raw material is such that a polymer dissolving lithium salt at concentrations of 0.1 M or more shows electrical conductivity of $10^{-6}$ S (siemens)/cm or more, or more preferably $10^{-5}$ S/cm or more, or most preferably $10^{-1}$ S/cm or more at room temperature. A cellulose type semi-interpenetrating network system (IPN) is described in JP-A-8-225626, PVA type semi-interpenetrating network system is disclosed in Japanese Patent Application 11-78087 (PCT/JP 00/01734), polyglycidol semi-interpenetrating network system is disclosed in Japanese Patent Application 10-358825 (PCT/JP 99/07039), and polyurethane type semi-interpenetrating network system is disclosed in Japanese Patent Application 11-78085 (PCT/JP 00/01731).

(j) Current Collector

The current collector 11 may be any material which allows an electric current to pass. Its shape and material are selected depending upon each electrical component. As an example, a conductive material such as aluminum, copper, etc. is formed in planar shape, or in form of foil or mesh. The surface is processed by either a chemical, an electrical or a physical process or by a combination of these processes; surface irregularities and a coarse surface are formed to provide a current collector with better adhesion properties. In case of a current collector 11 in a planar shape or foil, one surface or both surfaces are used depending on the structure of the electrical component, the electrode material is attached on one surface or both surfaces.

(k) Accommodation Unit

The accommodation unit 4 of the electrical component is a container to accommodate an element member 3, which comprises a pair of electrode structures. This may be any container commonly used in the past, and comes in various forms. For instance, an external material of a battery serving as the accommodation unit 4 includes a metal case made of aluminum or stainless steel, or pouch type or pill package type or pillow case type made of aluminum laminated plastic film.

Figure 3A:
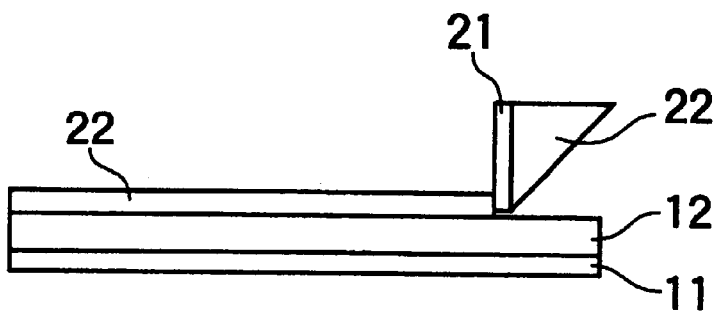
FIGS. 3A–3C represents drawings each showing an ion conductive polymer layer.
Figure 3B:
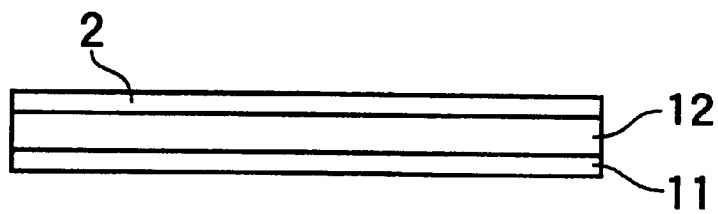
Figure 3C:
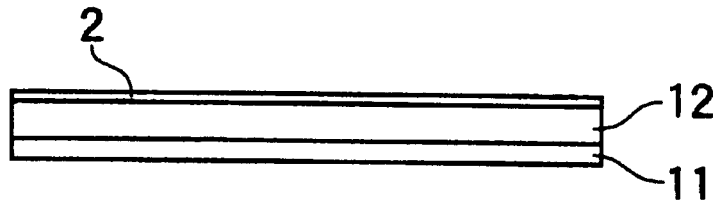
Figure 5A:
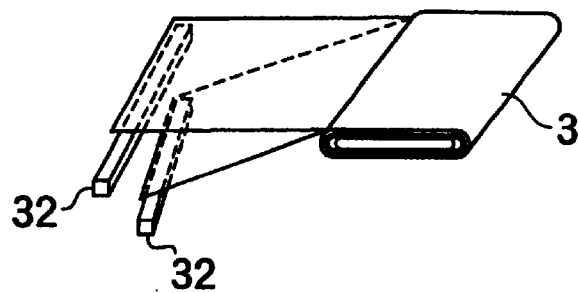
FIGS. 5A–5D represents drawings of element members and an accommodation unit.
Figure 5B:
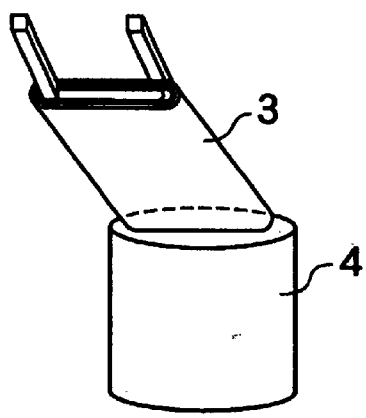
Figure 5C:
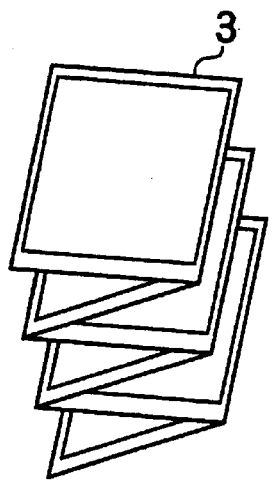
Figure 5D:
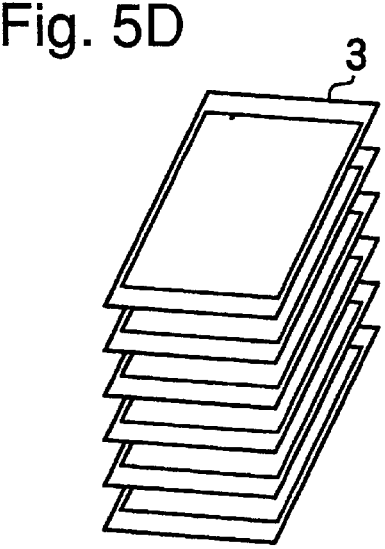

In the following, the method for manufacturing the electrical component will be described: (a) Formation of the ion conductive polymer layer to the electrode structure A coating material 22 for forming a paste-like ion conductive polymer layer to serve as the ion conductive polymer layer 2 is thinly coated on the surface of the electrode material layer 12 of the electrode structure 1 as shown in FIG. 3 using an applicator 21 (FIG. 3(A)), resulting in an ion conductive polymer layer 2 being formed on the electrode structure 1 (FIG. 3(B)). The coating material 22 for forming the ion conductive polymer layer is a material for forming the ion conductive polymer layer 2 by coating, and it is the ion conductive polymer forming material or a mixture of this with ion conductive salt such as lithium salt or a solvent. In case of the coating material 22 for forming ion conductive polymer layer, which is a mixture of ion conductive polymer forming material with organic solvent, it is dried after coating, and then the solvent is purged from the ion conductive polymer layer 2 (FIG. 3(C)). When the coating material 22 for forming ion conductive polymer layer mixed with ion conductive salt such as lithium salt is coated on the ion conductive polymer forming material, ions such as lithium ions, are dissolved in the ion conductive polymer layer 2.

(b) Arrangement of a Pair of Electrode Structures at Opposed Positions

The ion conductive polymer layer 2 is formed at least on one of a pair of the electrode structures 1. For instance, as shown in FIG. 4, a pair of the electrode structures 1 are arranged at opposed positions, and an element member 3 is fabricated (FIG. 4(A)). Or, the ion conductive polymer layer 2 is formed on both pairs of the electrode structures 1, and these may be used as the element member 3. Or rather, between a pair of the electrode structures 1 where the ion conductive polymer layer 2 is formed on one or both of the pair, a separator 31 may be arranged, and this may be used as the element member 3 of the electrode structures 1 (FIG. 4(B)).

To judge whether it is dissolved or not is determined by the measurement of wide-angle X-ray scattering or examination under a polarized microscope. A dried polymer layer is examined under the polarized microscope. Two polarizing plates are inserted in the vertical direction. The polymer layer is placed under dark field. If birefringence is not observed, no crystal exists. If it is dissolved in X-ray diffraction, a peak derived from crystal is not observed. As a result, it has been found that salt is almost perfectly dissolved in the ion conductive polymer layer of the present invention.

(c) Separator

Any type of separator may be used that have insulating properties and allow ions to pass. For instance, polyethylene nonwoven fabric porous film, polypropylene nonwoven fabric porous film, polyester nonwoven fabric polymer porous film, PTFE porous film, craft paper, rayon fiber, saisal fiber mixed sheet, Manila hemp sheet, glass fiber sheet, cellulose type electrolytic paper, paper made of rayon fiber, mixed paper made of cellulose and glass fiber, or any of these materials are combined in two or more layers and are used.

(d) Accommodation of the Element Member in the Accommodation Unit

A pair of electrode structures arranged at opposed positions, i.e. the element members 3, are accommodated in the accommodation unit 4 as shown in FIG. 5. There are various methods to facilitate such accommodation. For instance, a method to wind up the element member 3 (FIG. 5(B)), a method to fold the element member 3 (FIG. 5(C)), or a method to overlap a plurality of element members 3 (FIG. 5(D)) may all be used.

(e) Injection of Liquid Electrolyte into the Accommodation Unit

When liquid electrolyte is injected into the accommodation unit 4, the liquid electrolyte permeates into the ion conductive polymer layer 12 of the element member 3, and the ion conductive polymer layer 12 swells. Also, the liquid electrolyte permeates into gaps in the electrode material layer or penetrates into the ion conductive polymer itself, which is adhered to the powdery electrode material.

It is preferable that the ion conductive polymer itself or the ion conductive polymer raw material is put into the liquid electrolyte. When the liquid electrolyte not containing ion conductive salt is added, total ion concentration may be decreased. In this respect, it is preferable that ion conductive salt is put into it. It is preferable that (concentration of ion conductive salt in the ion conductive polymer)> (concentration of ion conductive salt in the liquid electrolyte) because liquid electrolyte rapidly permeates into the ion conductive polymer layer 12 by osmotic pressure. This may be attributed to the fact that the liquid electrolyte enters the ion conductive polymer layer 12 with a higher concentration because of osmotic pressure. The ion conductive polymer raw material permeates together with the liquid electrolyte into the ion conductive polymer layer or into the electrode material layer. Then, it reacts when heated, and is turned into 3-dimentional network. As a result, the electrode structures at opposed positions are integrated with the polymer layer.

Now, the method for manufacturing the electrical component will be described in greater detail.

(A) EXAMPLE 1

Coating of the Coating Material for Forming Ion Conductive Polymer Layer on Positive Electrode Structure of the Battery One weight part of cyanoethylated dihydroxypropyl cellulose and lithium perchlorate were dissolved in tetrahydrofurane. This solution was left to stand under reduced pressure to evaporate the tetrahydrofurane. Then, 0.2 weight part of polyethylene glycol dimethacrylate (oxyethylene unit number=9) and 0.2 weight part of methoxypolyethylene glycol monomethacrylate (oxyethylene unit number=9) were added. Further, 0.0008 weight part of azobis-isobutyronitrile was added so that lithium perchlorate was to be 1 mol per 1 kg of total weight containing all components. The complex product thus obtained was a viscous solution. Cyanoethylated dihydroxypropyl cellulose as described above is disclosed in JP-A-8-225626. The materials are described in: Macromolecules, 24, 4691 (1991) and Makromol. Chem. 193, 647 (1992).

Specifically, the components were added so that lithium perchlorate was to be 1 mol per 1 kg of the total weight of the mixture of lithium perchlorate+cyanoethylated dihydroxypropyl cellulose+polyethylene glycol dimethacrylate+methoxypolyethylene glycol monomethacrylate+azobis-isobutyronitrile, and the coating material 22 for forming the ion conductive polymer layer of the complex product of polymer electrolyte—lithium perchlorate was prepared.

The coating material 22 for forming the ion conductive polymer layer of the polymer electrolyte—lithium perchlorate complex product thus prepared was cast on a positive electrode structure (the electrode structure 1 prepared by coating the positive electrode material on the current collector) using a doctor knife applicator. It was left to stand at 80° C. for 0.5 hour, and an ion conductive solid macromolecular electrolyte film layer in semi-solid state (ion conductive polymer layer 2) resulted. The electrode material of the negative electrode structure was overlapped at an opposite position on the film layer (ion conductive polymer layer 2) relative to the positive electrode structure. This was left to stand at 80° C. for one hour, and the element member 3 resulted.

(B) EXAMPLE 2

Coating of the Coating Material for Forming Ion Conductive Polymer Layer on Both of Positive Electrode Structure and Negative Electrode Structure On the negative electrode structure, the complex product of polymer electrolyte—lithium perchlorate (coating material 22 for forming ion conductive polymer layer) prepared in Example 1 was cast using an applicator. This was left to stand at 80° C. for 0.5 hour, and ion conductive solid macromolecular electrolyte film layer in semi-solid state (ion conductive polymer layer 2) was formed, and a negative electrode structure with the ion conductive polymer layer 2 was prepared. Then, the same procedure as in Example 1 was performed except that the negative electrode structure was used. Positive and negative electrode structures were arranged at opposed positions with the sides of the ion conductive polymer layers facing to each other, and the element member 3 resulted.

(C) EXAMPLE 3

Coating of the Coating material for Forming Ion Conductive Polymer Layer on Both of Positive Electrode Structure and Negative Electrode Structure with a Separator Between Them The complex product of polymer electrolyte—lithium perchlorate as prepared in Example 1 was cast on the positive electrode structure and the negative electrode structure using an applicator. The positive electrode structure and the negative electrode structure were arranged at opposed positions via a separator 31. This was left to stand at 80° C. for one hour, and an element member 3 resulted.

(D) EXAMPLES 4–6

Coating of Complex Product of Polymer Electrolyte—Lithium Perchlorate Using Auxiliary Solvent in Examples 1 to 3

One weight part of cyanoethylated dihydroxypropyl cellulose and lithium perchlorate were dissolved in tetrahydrofurane. Then, 0.2 weight part of polyethylene glycol dimethacrylate (oxyethylene unit number=9) and 0.2 weight part of methoxypolyethylene glycol monomethacrylate (oxyethylene unit number=9) were added. Further, 0.0008 weight part of azobis-isobutyronitrile was added. It was designed in such manner that lithium perchlorate was to be 1 mol per 1 kg of total weight of all components except the auxiliary solvent tetrahydrofurane. Thus, a coating material 22 for forming ion conductive polymer layer of complex product of polymer electrolyte—lithium perchlorate containing auxiliary solvent resulted.

In Examples 4–6, the complex product of polymer electrolyte—lithium perchlorate (coating material 22 for forming ion conductive polymer layer) thus prepared was used in the same manner as in Examples 1–3 instead of the complex product of polymer electrolyte—lithium perchlorate used in Examples 4–6. After casting, this was left to stand at 80° C. for 3 hours to evaporate the tetrahydrofurane. Thus, ion conductive solid macromolecular electrolyte film layer (ion conductive polymer layer 2) in thin film and semi-solid state was prepared.

(E) EXAMPLES 7–9

Coating of Complex Product of Polymer Electrolyte—Lithium Perchlorate Using Different Ion Conductive Polymer Raw Material in Examples 1–3

One weight part of cyanoethylated dihydroxypropyl cellulose and lithium perchlorate were dissolved in tetrahydrofurane. This solution was left to stand under reduced pressure to evaporate the tetrahydrofurane. Then, a predetermined quantity of polyurethane crosslinking agent was added. As the polyurethane crosslinking agent, the agent was mixed with a polyol solution and an isocyanate solution. In this case, 0.17 weight part of copolymerized polymer polyol (OH value=1.215 mg/kg; crosslinking agent 3) containing a mixture of ethylene oxide and polyethylene oxide (8:2 in volume ratio) of glycerin base was used as the polyol solution. As isocyanate solution, 0.03 weight part of polyisocyanate (NCO value=7.381 mg/kg; crosslinking agent 4) was used. These components were arranged in such manner that lithium perchlorate was to be 1 mol per 1 kg of total weight of all components (i.e. weight of lithium perchlorate+weight of polymer derivative+weight of polyol solution+weight of isocyanate solution). Thus, the complex product of polymer electrolyte—lithium perchlorate (coating material 22 for forming ion conductive polymer layer) was prepared. The complex product thus prepared was a viscous solution.

In Examples 7–9, the complex product of polymer electrolyte—lithium perchlorate as prepared in this case (coating material 22 for forming ion conductive polymer layer) was used instead of the complex product of polymer electrolyte—lithium perchlorate used in Examples 1–3. The other procedure used was the same as described above.

(F) EXAMPLES 10–12

Coating of Complex Product of Polymer Electrolyte—Lithium Perchlorate in Examples 7–9 Using Auxiliary Solvent One weight part of cyanoethylated dihydroxypropyl cellulose and lithium perchlorate were dissolved in tetrahydrofurane. Then, 0.2 weight part of polyethylene glycol dimethacrylate (oxyethylene unit number=9) and 0.2 weight part of methoxypolyethylene glycol monomethacrylate (oxyethylene unit number=9) were added. Further, 0.0008 weight part of azobis-isobutyronitrile was added so that lithium perchlorate was to be 1 mol per 1 kg of total weight of all components except the auxiliary solvent tetrahydrofurane. Thus, the complex product of polymer electrolyte—lithium perchlorate containing auxiliary solvent (coating material 22 for forming ion conductive polymer layer) was prepared.

In Examples 10–12, the complex product of polymer electrolyte—lithium perchlorate (coating material 22 for forming ion conductive polymer layer) as prepared was used instead of the complex product of polymer electrolyte— lithium perchlorate used in the same manner as in Examples 7–9. After coating, it was left to stand at 80° C. for 3 hours to evaporate the tetrahydrofurane. Thus, ion conductive solid macromolecular electrolyte film layer (ion conductive polymer layer 2) in thin film and semi-solid state was prepared. The other procedure was the same as described above.

(G) EXAMPLE 13

Preparation of Secondary Battery

The element member 3 as prepared in each of Examples 1–12 was wound up. At the end of the member thus wound up, tabs 32 and 32 for terminal were attached, and the members were placed into the accommodation unit 4 of the external case. Then, 0.05 weight part of polyethylene glycol dimethacrylate (oxyethylene unit number=9), 0.05 weight part of methoxypolyethylene glycol monomethacrylate (oxyethylene unit number=9), and 0.0002 weight part of azobis-isobutyronitrile were dissolved in 0.9 weight part of the solvent containing ethylene carbonate/diethylene carbonate (1/1 in molar ratio). This procedure was performed in such manner that the lithium perchlorate is at a concentration of 0.7 mol/kg in this solution (liquid electrolyte A). This solution (liquid electrolyte A) was injected into the external case (accommodation unit 4).

This liquid electrolyte (liquid electrolyte A) permeated to the ion conductive polymer layer and absorbed the liquid electrolyte, and it swelled. It adhered to positive and negative electrode structures, and a film battery in wound-up state was obtained. The battery with the ion conductive solid macromolecular electrolyte film layer (ion conductive polymer layer) produced in each of the above Examples (Examples 1–12) was chargeable and dischargeable, and it was found that the battery can effectively fulfill the function of a lithium secondary battery.

(H) EXAMPLE 14

Preparation of All-solid Type Secondary Battery

The element member 3 obtained in Example 1 was cut in size of 3×3 cm (length×width), and tab was attached, and a single layer battery was prepared. This was placed in the external case. Then, it was sealed, and the battery was heated to 80° C., and charging and discharging were performed. As a result, it was confirmed that the battery operated as an all-solid type battery.

(I) EXAMPLE 15

Measurement of Swelling of Ion Conductive Polymer Film

The coating material 22 for forming the ion conductive polymer as obtained in Example 1 was cast using an applicator on a glass plate, which was thinly coated with a silicon mold releasing agent. The thickness was 100 $\mu$m. The glass plate with silicon mold releasing agent was placed with a spacer of 100 $\mu$m and was sandwiched. It was left to stand at 80° C. for one hour to react. The polymer electrolyte film thus obtained contained liquid electrolyte of 1 mol/kg. The film thus obtained was immersed into the solution of Example 13 (liquid electrolyte A) containing perchlorate solution of 0.5 mol, 0.7 mol and 1 mol respectively, and volume swellability was determined. The results are summarized in Table 1. It was found that, the higher the salt concentration in the ion conductive polymer film was, the more rapidly the solution permeated, and the higher the swellability was.

TABLE 1

| Salt concentration in liquid electrolyte A (mol/kg) | Volume swellability of ion conductive polymer film (%) |
|---|---|
| 0.5 | 186.1 |
| 0.7 | 172.8 |
| 1.0 | 153.1 |

In the following, a method for manufacturing electrode structure with electrode material, to which ion conductive polymer is adhered will be described.

(a) Method for Manufacturing Electrode Structures

To manufacture the electrode structures, ion conductive polymer or ion conductive polymer raw material or a mixture of these, i.e. the material for forming ion conductive polymer, is attached in a very thin layer on the surface of an electrode material. Then, a solvent is added to turn it into a liquid and paste-like state. This is coated on a current collector and is dried to evaporate the solvent. Or, the solvent may be added from the beginning, and it may be turned to paste-like state at the same time as it is adhered to the ion conductive polymer forming material.

In this case, only a slight quantity of the ion conductive polymer forming material is used. The surfaces of particles of the powdery electrode material are adhered with the ion conductive polymer so that there will be no void, and that gaps between powder particles will be minimized.

To adhere the ion conductive polymer forming material with powdery electrode material, the ion conductive polymer forming material and the powdery electrode material are pressurized and ground against each other, and a pressurized product is obtained.

(b) Pressurizing and Grinding

Pressurizing and grinding is defined as an operation to grind a mixture 50 of the ion conductive polymer forming material and the powdery electrode material 13 against each other while pressurizing. External force is applied on the mixture 50 to make the mixture 50 pressed tightly. When the particles are rotated and this procedure is repeated, a pressurized product is obtained.

(c) Pressurizing, Grinding and Kneading Device

A pressurizing, grinding and kneading device 5 is as shown in FIG. 6. The mixture 50 of the ion conductive polymer forming material and the powdery electrode material 13, or a mixture 50 containing this mixture and solvent, is placed in a container 51, and a main blade 52 is rotated. There is a gap between a bottom 511 of the container 51 and the main blade 52. When the main blade 52 is rotated, a part of the mixture 10 is moved between the bottom 211 of the container and the main blade 22. It is pressurized and ground against each other and kneaded. This procedure is repeated, and the ion conductive polymer forming material is adhered to the powdery electrode material 13.

In the pressurizing, grinding and kneading device 5, a dispersing blade 53 is provided in the container 51. By rotating the dispersing blade 53 at high speed, the mixture 50 pressurized and ground is dispersed.

(d) Container

The mixture 50 is pressurized and ground against each other in the container 51, and the container accommodates the mixture 50 to agitate. At the bottom of the container 51, there is provided a lower portion 5111 with a part of it at lower position. The bottom surface is inclined upward as it goes toward the peripheral portion. For instance, it is lower at the center, and it gradually goes up toward the periphery. It is formed in a bottom 511 in the shape of the conical mortar. The inclination angle of the lower portion 5111 is set to 120° C., for example. The bottom 511 of the container has wear resistant property. It is made of SUS, for instance, and spraying tungsten or carbide forms it. A plurality of the lower portions 5111 maybe provided at the bottom surface.

(e) Main Blade

Figure 6A:
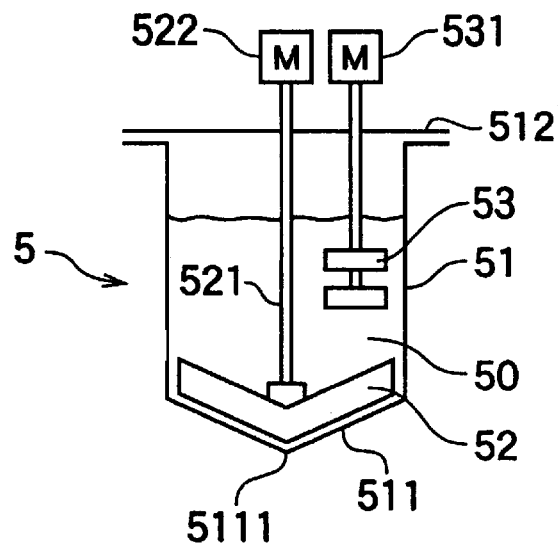
FIGS. 6A–6D represents drawings to explain a pressurizing, grinding and kneading device.
Figure 6B:
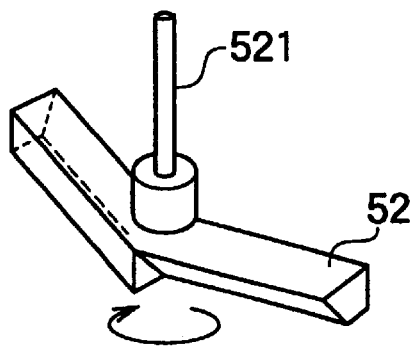

The main blade 52 cooperates with the bottom surface of the container 51 to pressurize, grind and agitate the mixture. As shown in FIG. 6(B), the main blade 52 has its shaft mounted in a position corresponding to the lower portion 5111 of the container 51, and is bent upward along the bottom of the container from the lower portion 5111. As shown in FIG. 6(B), two blades of the main blade 52 are mounted from the central portion. There may be two or more blades, and the number of blades is determined depending on the quantity and the type of the mixture.

The number of revolutions of a main motor 522 for driving a main shaft 521 of the main blade is at low speed during pressurizing and grinding operation. It is set, for instance, to 120 rpm or lower.

The gap between the bottom surface of the container 51 and the bottom surface of the main blade 52 is designed so narrow that the mixture can be pressurized and ground against each other. This gap is set to 15 mm or less, for example. The distance of the gap depends upon the capacity of the pressurizing, grinding and kneading device or on the shape of the main blade.

Figure 6C:
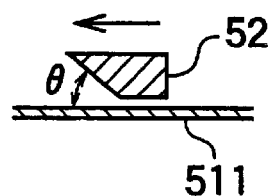
Figure 6D:
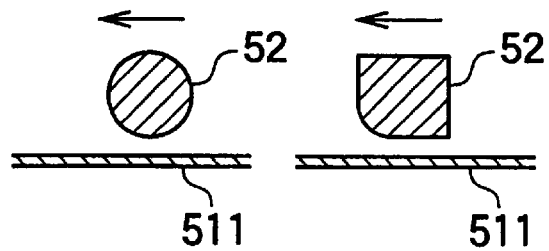

The surface of the main blade 52 in advancing direction (i.e. direction of pressurizing and grinding) is set in such manner that pressurizing angle θ with respect to the bottom surface of the container 51 will be an acute angle. For example, as shown in FIG. 6(C), when the cross-section of the main blade 52 is in form of an inverted trapezoid, the pressurizing angle is set to 3°–70°. The cross-section of the main blade 52 may be in circular or rectangular shape with a rounded corner as shown in FIG. 6(D). The material of the main blade must be wear-resistant. For instance, SUS should be used, and it is formed by spraying tungsten or carbide.

The surface of the main blade 52 opposite to the advancing direction (direction of pressurizing and grinding) is designed in such manner that it runs almost perpendicularly to the bottom surface and at acute angle. As a result, when the main shaft 521 is rotated in reverse direction, the mixture 50 can be collected on the periphery of the main shaft 521.

In case there is a plurality of lower portions 5111 at the bottom surface, the central portion of the main blade 52 is also arranged at the positions corresponding to the number of the lower portions.

(f) Dispersing Blade

The dispersing blade 53 is to disperse the mixture 50, which is pressurized and ground by the main blade 52. The dispersing blade 53 is arranged at such position as to disperse the mixture 50, and it is rotated at high speed, i.e. at 1000–4000 rpm. By rotating it at high speed, the ion conductive polymer 16 or its raw material adhered on the surface of the particles of the powdery electrode material 13 are evenly dispersed over the entire powdery material.

(g) Coating on Current Collector

The pressurized product, which was pressurized and ground and was turned into paste-like state, is thinly coated on the surface of the current collector. After coating, the solvent is evaporated, and the product is dried, and an electrode structure is obtained. As the device to coat the pressurized product on the current collector, an applicator is used.

Figure 7:
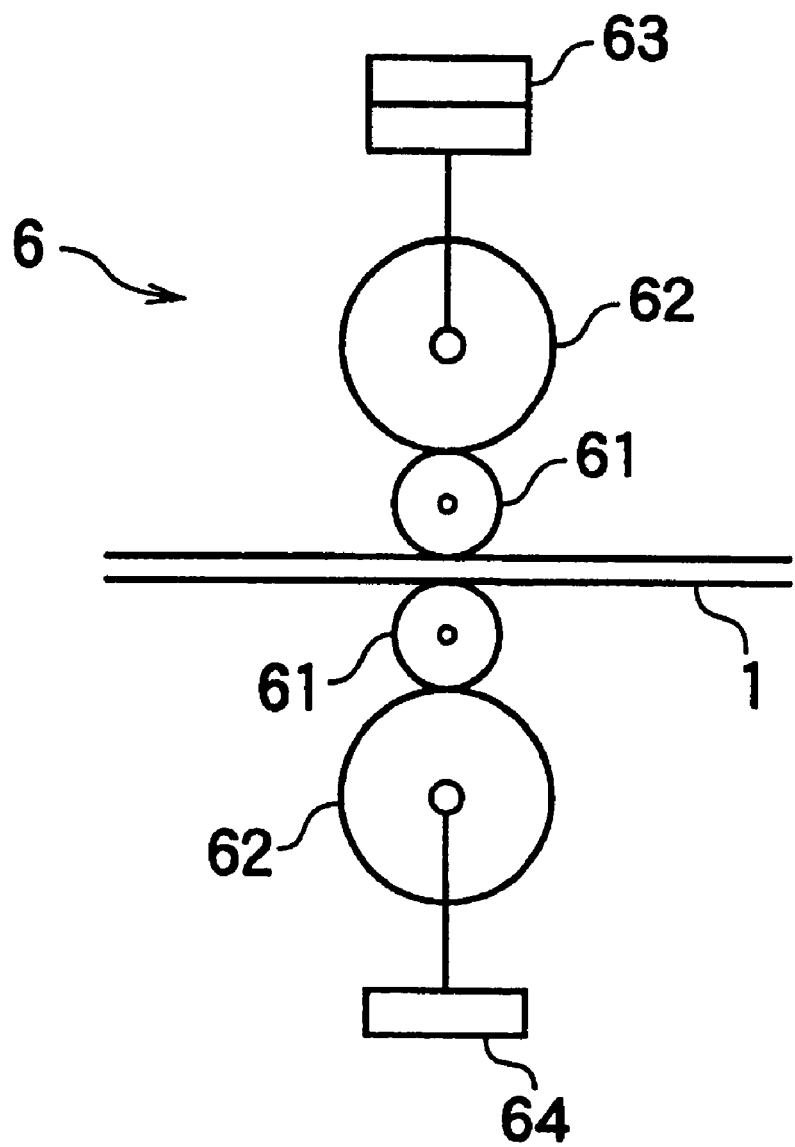
FIG. 7 is a drawing to explain a fixing or adhesion device.

The pressurized product thus coated may be pressed against the current collector to tightly fix it. To fix this, a tightly fixing device 6 as shown in FIG. 7 is used. In the fixing or adhesion device 6, an electrode structure 1 comprising the current collector coated with the pressurized product is sandwiched between pressure rollers 61. A backup roller 62 is rotated under pressure between the pressure device 63 and a fixed member 64. The pressurized product is tightly fixed on the current collector, and the electrode structure 1 can be produced.

An example of the electrode structure is described below.

(a) Manufactured Example 1 of Positive Electrode Structure

Into a pressurizing, grinding and kneading device, 9.1 weight parts of $LiCoO_2$ with average particle size of 5 μm, i.e. powdery electrode active material, and 0.6 weight part of graphite powder with average particle size of 4 μm, i.e. powdery conductive material, are placed, and the mixture was pressurized and ground for 20 minutes. Then, 0.546 weight part of an ion conductive polymer raw material (A1) and 3.5 weight parts of acetonitrile were added. The ion conductive polymer raw material (A1) is a mixture, and its composition and mixing ratio are as shown in Table 2.

TABLE 2

| Ion conductive polymer raw material (A1) | |
|---|---|
| Substance | Mixing ratio (weight parts) |
| 3-functional (propylene glycol/ethylene glycol) random copolymer, SANNIX FA-103 (PO/EO = 2/8, Mw = 3,282, Sanyo Chemical Industries, Ltd.) | 8.36 |
| 1,4-butanediol of 2-functional polyol | 0.34 |
| Ethylene cyanohydrin | 1.27 |
| Reaction catalyst NC-IM (Sankyo Air Products K.K.) | 0.03 |
| Total | 10 |

The pressurized product added with the ion conductive polymer raw material (A1) was pressurized and ground for 5 hours in the pressurizing, grinding and kneading device. The pressurized product was turned into a paste-like state. To the pressurized product, 0.254 weight part of polymeric MDI (MR-220; manufactured by NPU) was added, and the mixture was agitated for 5 minutes in the pressurizing, grinding and kneading device. The pressurized product was taken out and was placed on an aluminum foil of 20 μm in thickness, and it was cast using an applicator with gap of 100 μm. It was left to stand at room temperature for 15 minutes. Then, it was heated at 80° C. for one hour. The positive electrode structure thus prepared had thickness of 80 μm.

(b) Manufactured Example 2 of Positive Electrode Structure

Into a pressurizing, grinding and kneading device (volume capacity: 300 cc), 9.0 weight parts of $LiCoO_2$ with average particle of 5 μm, i.e. powdery electrode material, 0.6 weight part of ketchen black, i.e. powder conductive material, and 0.2 weight part of graphite powder with average particle size of 4 μm were placed, and the mixture was pressurized and ground for 20 minutes. Then, 1.172 weight parts of ion conductive polymer raw material (A1) and 3.5 weight parts of acetonitrile were added. This mixture was pressurized and ground in the pressurizing, grinding and kneading device for 5 hours. The pressurized product was turned into a paste-like state. To the pressurized product, 0.548 weight part of polymeric MDI (MR-200; manufactured by NPU) was added, and the mixture was pressurized and ground for 5 minutes. The pressurized product was taken out, and this was placed on an aluminum foil of 20 μm in thickness and was cast using an applicator with gap of 100 μm. Then, this was left to stand at room temperature for 15 minutes and was then heated at 80° C. for one hour. The electrode thus obtained had a thickness of 80 μm.

(c) Manufactured Example 3 of Positive Electrode Structure

Into a pressurizing, grinding and kneading device (volume capacity: 300 cc), 9.1 weight part of $LiCoO_2$ with average particle size of 5 μm, i.e. powdery electrode active material, 0.341 weight part of ion conductive polymer raw material (A1), and 3.0 weight parts of acetonitrile were placed, and the mixture was pressurized and ground for 7 hours. The pressurized product was turned into a paste-like state. Then, 0.159 weight part of polymeric MDI (MR-200; manufactured by NPU) was added, and the mixture was pressurized and ground for 5 minutes. The pressurized product was removed, and this was placed on an aluminum foil of 20 μm in thickness and was cast using an applicator with a gap of 100 μm. Then, this was left to stand at room temperature for 15 minutes and was then heated at 80° C. for one hour. The electrode thus obtained had thickness of 80 μm.

(d) Manufactured Example 4 of Positive Electrode Structure

Into a pressurizing, grinding and kneading device (volume capacity: 300 cc), 9.1 weight parts of $LiCoO_2$ with average particle size of 5 μm, i.e. powdery electrode active material, and 0.6 weight part of graphite powder with average particle size of 4 μm, i.e. powdery conductive material, were placed, and the mixture was pressurized and ground for 20minutes. Then, 2.0weight parts of ion conductive polymer raw material (A2) and 3.0 weight parts of acetonitrile were added. The ion conductive polymer raw material (A2) is a mixture, and its composition and mixing ratio are as shown in Table 3.

TABLE 3

| Ion conductive polymer raw material (A2) | |
| --- | --- |
| Substance | Mixing ratio (weight parts) |
| Cyanoethylated dihydroxypropylated polyvinyl alcohol | 0.625 |
| Methoxypolyethylene glycol methacrylate (Mw: 468) | 3.125 |
| Trimethylolpropane trimethacrylate | 6.25 |
| Total | 10 |

The pressurized product added with the ion conductive polymer raw material (A2) was pressurized and ground for 5 hours in a pressurizing, grinding and kneading device (volume capacity: 300 cc). The pressurized product was turned into a paste-like state. A solution was prepared by dissolving 0.01 weight of 2,2'-azobis (2,4-dimethyl-valeronitrile) and 0.5 weight part of liquid electrolyte containing ethylene carbonate (EC)/diethylene carbonate (DEC)=(1/1) in volume ratio. This solution was added to the pressurized product, and the mixture was pressurized and ground for 5 minutes. The pressurized product was removed and placed on an aluminum foil of 20 μm in thickness and was cast using an applicator with gap of 100 μm. This was left to stand at room temperature for 15 minutes and was then heated at 80° C. for 3 hours. The electrode thus obtained had a thickness of 80 μm.

(e) Manufactured Example 5 of Negative Electrode Structure

Into a pressurizing, grinding and kneading device (volume capacity: 300 cc), 9.1 weight parts of graphite powder with average particle size of 5 μm, i.e. powdery electrode active material, 0.341 weight part of ion conductive polymer raw material (A1), and 3.0 weight parts of acetonitrile were placed, and the mixture was pressurized and ground for 7 hours. The pressurized product was turned to paste-like state. Then, 0.159 weight part of polymeric MDI (MR-200; manufactured by NPU) was added, and the mixture was pressurized and ground for 5 minutes. The pressurized product was removed and was placed on a copper foil of 20 μm in thickness and was cast using an applicator with gap of 100 μm. This was left to stand at room temperature for 15 minutes and was then heated at 80° C. for one hour. The electrode thus obtained had a thickness of 80 μm.

(f) Manufactured Example 6 of Negative Electrode Structure

Into a pressurizing, grinding and kneading device (volume capacity: 300 cc), 9.1 weight parts of graphite powder with average particle size of 5 μm, i.e. powdery electrode active material, 0.2 weight part of ion conductive polymer raw material (A2), and 3.0 weight parts of acetonitrile were placed, and the mixture was pressurized and ground for 5 hours. The pressurized product was turned to a paste-like state. A solution was prepared by dissolving 0.01 weight part of 2,2'-azobis(2,4-dimethyl-valeronitrile) and 0.5 weight part of liquid electrolyte containing ethylene carbonate (EC)/diethylene carbonate (DEC) in volume ratio of 1:1. This solution was added to the pressurized product, and the mixture was pressurized and ground for 5 minutes. The pressurized product was removed and was placed on a copper foil of 20 μm in thickness and was cast using an applicator with gap of 100 μm. This was left to stand at room temperature for 15 minutes and was then heated at 80° C. for 3 hours. The electrode thus obtained had thickness of 80 μm.

(g) Manufactured Example 7 of Electrode Structure for Capacitor

To prepare an electrode for capacitor, carbon black was added as powdery conductive material to phenol derived activated carbon (manufactured by Kansai Chemical Co., Ltd.) as electrode material. This was processed by dry mixing using a mixer. Then, polymer A1 was added as a binder and was mixed. Further, NMP (N-methylpyrrolidone) was added as solvent and was mixed. After mixing, this was cast on a current collector using a doctor knife applicator. The specimen was dried under infrared light or hot air. The thickness of the electrode thus prepared was 75 μm.

The details of the procedure for manufacturing the electrode structures as described above are given in the patent applications filed by the applicants of the present invention (Japanese Patent Applications 11-262501, 11-262502 and 11-2691124).

According to the present invention, the following effects can be obtained:

According to the present invention, it is possible to obtain an electrical component, in which ions migrate between electrodes and which provides a high efficiency.

According to the present invention, it is possible to obtain an electrical component, in which ions migrate between electrodes and which ensures a degree of high safety.

According to the present invention, it is possible to obtain a battery with higher efficiency or an electrical double layer capacitor with higher efficiency.

It is readily apparent that the above-described invention has the advantages of wide commercial utility. It may be understood that the specific form of the invention hereinabove described is intended to be representative only, and certain modifications within the scope of these teachings will be apparent to those skilled in the art without departing from the spirit and scope of the invention.

Accordingly, reference should be made to the following claims in determining the full scope of the invention.

What we claim is:

1. A method for manufacturing an electrical component, in which ions migrate between electrodes, said method comprising the steps of;

forming an ion conductive polymer layer containing dissolved ions on an electrode material layer of at least one of a pair of electrode structures comprising an electrode material layer formed on a current collector; and arranging said pair of electrode structures at opposed positions and storing in a housing; and injecting a liquid electrolyte into said housing.

2. A method for manufacturing an electrical component according to claim 1, wherein said method further comprises a step of mixing an ion conductive salt with the ion conductive polymer forming material and forming or disposing the mixed ion conductive polymer layer on the electrode material layer.

3. A method for manufacturing an electrical component according to claim 2, wherein the ion conductive salt is substantially dissociated in the ion conductive polymer layer.

4. A method for manufacturing an electrical component according to claim 1, wherein, when forming the ion conductive polymer layer, a mixture of an ion conductive polymer and an ion conductive polymer raw material is coated on the electrode material layer.

5. A method far manufacturing an electrical component according to claim 1, wherein, when forming the ion conductive polymer layer, an ion conductive saltland an organic solvent are mixed with an ion conductive polymer forming material and formed on the electrode material layer, and the organic solvent is evaporated.

6. A method for manufacturing an electrical component according to claim 5, wherein the ion conductive salt is substantially dissociated in the ion conductive polymer layer even when the organic solvent is evaporated.

7. A method for manufacturing an electrical component according to claim 1, wherein the liquid electrolyte contains an ion conductive polymer raw material.

8. A method for manufacturing an electrical component according to claim 1, wherein the liquid electrolyte contains ions.

9. A method for manufacturing an electrical component according to claim 8, wherein concentration of the ion conductive salt in the ion conductive polymer layer is higher than concentration of the ion conductive salt in the liquid electrolyte.

10. A method for manufacturing an electrical component according to claim 1, wherein a separator is disposed between said pair of electrode structures.

11. A method for manufacturing an electrical component according to claim 1, wherein the electrode material of at least one of the electrode structures is adhered and covered with an ion conductive polymer.

12. A method for manufacturing an electrical component according to claim 1, wherein the electrode material layer of at least one of the electrode structures contains a conductive material.

13. A method for manufacturing an electrical component according to claim 1, wherein said pair of electrode structures are designed as a positive electrode structure and a negative electrode structure using an electrode active material as the electrode material, and the electrical component is designed as a battery.

14. A method for manufacturing an electrical component according to claim 13, wherein copper is used as the current collector of the negative electrode structure, and the negative electrode structure is designed bigger than the positive electrode structure.

15. A method for manufacturing an electrical component according to claim 1, wherein a high surface area material having larger surface area is used as the electrode material of said pair of electrode structures, and the electrical component is designed as an electrical double layer capacitor.

* * * * *